United States Patent [19]
Nagata et al.

[11] Patent Number: 5,706,023
[45] Date of Patent: Jan. 6, 1998

[54] METHOD OF DRIVING AN IMAGE DISPLAY DEVICE BY DRIVING DISPLAY MATERIALS WITH ALTERNATING CURRENT

[75] Inventors: Seiichi Nagata, Sakai; Etsuya Takeda, Suita; Tetsuya Kawamura, Kyoto; Yutaka Nanno, Amagasaki, all of Japan

[73] Assignee: Matsushita Electric Industrial Co., Ltd., Osaka, Japan

[21] Appl. No.: 487,704

[22] Filed: Jun. 7, 1995

Related U.S. Application Data

[63] Continuation of Ser. No. 38,184, Mar. 29, 1993, abandoned, which is a continuation of Ser. No. 768,469, Sep. 30, 1991, abandoned, which is a continuation of Ser. No. 322,058, Mar. 13, 1989, abandoned.

[30] Foreign Application Priority Data

Mar. 11, 1988 [JP] Japan ................... 63-58765

[51] Int. Cl.⁶ ........................... G09G 3/36
[52] U.S. Cl. ........................... 345/92; 345/94
[58] Field of Search ............... 340/811, 812, 340/718, 719, 783, 784, 802, 805; 359/54, 56, 59; 345/87, 92, 93, 94, 96, 97; 349/39, 41, 42, 33

[56] References Cited

U.S. PATENT DOCUMENTS

| | | | |
|---|---|---|---|
| 4,393,380 | 7/1983 | Hosokawa et al. | 340/719 |
| 4,622,590 | 11/1986 | Togashi | 340/811 |
| 4,675,667 | 6/1987 | Nakamura et al. | 340/811 |
| 4,899,141 | 2/1990 | Morozumi | 340/811 |
| 4,909,602 | 3/1990 | Kaneko et al. | 340/784 |
| 4,928,095 | 5/1990 | Kawahara . | |

FOREIGN PATENT DOCUMENTS

| | | |
|---|---|---|
| 60-3698 | 1/1985 | Japan . |
| 60-151615 | 8/1985 | Japan . |
| 60-156095 | 8/1985 | Japan . |
| 61-256325 | 11/1986 | Japan . |
| 61-275822 | 12/1986 | Japan . |
| 61-275823 | 12/1986 | Japan . |
| 61-275824 | 12/1986 | Japan . |

OTHER PUBLICATIONS

"Compensation of the Display Electrode Voltage Distortion"; T. Yanagisawa et al.; Japan Display '86; pp. 192 and 194.

"A New Active Matrix LCD Architecture for Larger Size Flat TV Displays"; K. Oki et al.; Euro Display '87; pp. 55, 56 and 58.

"Compensative Addressing for Switching Distortion in A–Si TFTLCD"; Kouji Suzuki; Euro Display '87; pp. 107–110.

"Eliminating Crosstalk in Thin Film Transistor/Liquid Crystal Displays"; W. E. Howard et al.; 1988 International Display Research Conference; 1988 IEEE; pp. 230–235.

*Primary Examiner*—Richard Hjerpe
*Assistant Examiner*—Chanh Nguyen
*Attorney, Agent, or Firm*—Wenderoth, Lind & Ponack

[57] ABSTRACT

A method of driving a display device having a matrix of display material elements includes transmitting a picture signal voltage to each picture element electrode during an ON period of a respective switching element, applying a first modulation signal to a first wire during an OFF period of the switching elements associated with the first wire, and applying a second modulation signal to counter electrodes associated with the first wire during the OFF period of the switching elements associated with the first wire. Each picture element electrode of a plurality of the display material elements is connected to the first wire through a respective capacitance.

34 Claims, 11 Drawing Sheets

Change Of 2nd Modulation Voltage (Vt) and
Change Of Electric Potential At Picture Element Electrode (ΔV*)

METHOD OF DRIVING AN IMAGE DISPLAY DEVICE BY DRIVING DISPLAY MATERIALS WITH ALTERNATING CURRENT

This application is a Continuation now abandoned application, Ser. No. 08/038,184, filed Mar. 29, 1993, which is a Continuation of now abandoned application, Ser. No. 07/768,469, filed Sep. 30, 1991, which is a Continuation of abandoned application Ser. No. 07/322,058, filed Mar. 13, 1989.

BACKGROUND OF THE INVENTION

1. Field of the Invention

This invention relates to a method of driving an image display device by driving display materials, such as liquid crystals (having an anisotropic dielectric constant), in alternating currents, using an active matrix made up of switching elements, such as thin film transistors (TFT), and picture element electrodes, with the aims of (1) reducing the drive electric power consumption, (2) improving the display picture quality, and (3) enhancing the drive reliability.

2. Description of the Related Art

Recently, the quality of the displayed image of the active matrix liquid crystal display device has been notably improved, and is said to be equally comparable with that of the CRT. However, aspects of the picture quality which are inferior to the CRT and have not been negated include flicker, brightness changes in the vertical screen direction or brightness inclination, the image memory phenomenon in which the image of the fixed picture remains after display of the fixed picture, and gradation display performance. Further, nothing has been reported regarding techniques for solving the adverse effects of direct-current (DC) voltages and crosstalk inevitably occurring within the device through various parasitic capacitances.

As for measures for improving flicker, the patents discussed below are known. The prior art technique of inverting the polarity of the signal voltage in every field of the display screen is disclosed in Japanese Patent Laid-Open Patent No. 60-151615, No. 61-256325, and No. 61-275823. The prior art technique of inverting the polarity of the signal voltage in every scanning line on the display screen is disclosed in Japanese Patent Laid-Open Patent No. 60-3698, No. 60-156095 and No. 61-275822. The prior art technique of inverting in every scanning line while inverting the field is disclosed in Japanese Patent Laid-Open Patent No. 61-275824. These methods, however, are not intended to compensate for the DC voltage inevitably occurring as a result of parasitic capacitances in the display or dielectric anisotropy of the display materials, such as liquid crystals as mentioned below, and they are designed for decreasing the apparent overall flicker, not for decreasing fundamentally the flicker in every display picture element.

In a special active matrix constitution example, meanwhile, a method of decreasing crosstalk is disclosed by K. Oki et al. in Euro Display '87, p. 55 (1987). By adding a reference signal (aside from a scanning signal) to the scanning signal wiring before application of the scanning signal, this method is intended to decrease the picture signal amplitude, and hence decrease the crosstalk. Another crosstalk countermeasure is proposed, for example, by W. E. Howard et al. in I.D.R.C. (International Display Research Conference) '88, p. 230 (1988). In this method, after supplying the picture signal, a portion of the crosstalk voltage is compensated. In these methods, no particular consideration is directed to the compensation of a DC voltage resulting from the dielectric anisotropy of the liquid crystal.

At present, there is no patent, as far as the present inventors have investigated, directly intended to enhance the brightness inclination and gradation display performance of display pictures.

Incidentally, the following two prior art techniques are known as methods for compensating for the DC voltage inevitably generated in the display device by the dielectric anisotropy of the liquid crystal, decreasing the flicker fundamentally, and enhancing the drive reliability. The first prior art is disclosed by T. Yanagisawa et al. in Japan Display '86, p. 192 (1986). In this example, the DC voltage is compensated by varying the amplitude of the picture signal voltage (Vsig) between the positive side and negative side of the amplitude center voltage (Vc). The second prior art is proposed by K. Suzuki in Euro Display '87, p. 107 (1987). This example is intended to compensate by applying a positive addition signal (Ve) after the scanning signal.

Thirdly, through the parasitic capacitance (Cgd) between the gate and drain of the TFT, the scanning signal affects the display electrode potential, and a DC potential difference occurs between the mean potential of the picture signal wiring and the mean potential of the display electrode. In the case of AC driving of the liquid crystal, when the potential of the parts of the display device is set so that the mean DC potential difference between the display electrode and counter electrode may be zero, the DC potential difference inevitably appears between the picture signal wiring and counter electrode. This DC potential difference elicits serious display defects, such as image memory. However, a method intended to compensate for this so as to eliminate this DC potential difference has not been reported hitherto.

Fourthly, although the liquid crystal display device features, among other things, a small drive electric power, the power consumption of the driving circuit is very large (hundreds of mW) because analog signals are handled and the number of signal output circuits is enormous. This power consumption is so significant that it is not adequate for operating off of a dry cell power source or the like as a portable unit. It is therefore desired to develop a drive method having a much lower power consumption.

SUMMARY OF THE INVENTION

This invention is hence intended to solve the above-discussed problems, that is, to improve the display picture quality and drive reliability, and also to reduce the electric power consumed by the display device.

In the display device of this invention, in which picture element electrodes connected to a first wire through capacitances are arranged in a matrix form, switching elements electrically connected to the picture signal wire and scanning signal wire are connected to the picture element electrodes, and the display material placed between the picture element electrodes and counter electrodes are driven in alternating currents. By applying a first modulation signal to the first wire in the OFF period of the switching elements and also applying a second modulation signal to the counter electrodes, the potential between the counter electrodes and picture element electrodes is varied, and the change in the potential and the picture signal voltage are mutually superposed or canceled, and a voltage is applied to the display material.

In this constitution, by applying the first modulation signal to the first wire connected to the picture element electrode through an accumulated capacitance and applying the second modulation signal to the counter electrode, and modulating the potential difference between the first wire and the counter electrode, the capacitive coupling potential appearing at the picture element electrode through the related capacitance can be effectively utilized. As a result, at least part of the DC components induced through the capacitance between the gate and drain by the scanning signal and the dielectric anisotropy of the liquid crystal can be compensated, and the causes of flicker and image memory can be eliminated, and high quality display is realized, while the drive reliability of the display device may be enhanced at the same time. Furthermore, by supplying part of the liquid crystal drive voltage from the capacitive coupling potential, the output amplitude of the image drive signal may be decreased, and therefore the drive electric power may be conserved.

While the novel features of the invention are set forth with particularity in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 2(a)–(f) and FIGS. 4(a)–(f) are diagrams showing voltage waveforms to be applied to the basic composition shown in FIG. 1;

FIGS. 7(a)–(f) are diagrams showing voltage waveforms applied to the composition shown in FIG. 6;

FIGS. 9(a)–(d) are diagrams showing voltage waveforms applied to the composition shown in FIG. 8;

FIG. 11(a)–(d) depict voltage waveforms applied to the composition shown in FIG. 10.

DETAILED DESCRIPTION OF THE INVENTION

The theoretical background of the present invention is described first below.

Figure 1:
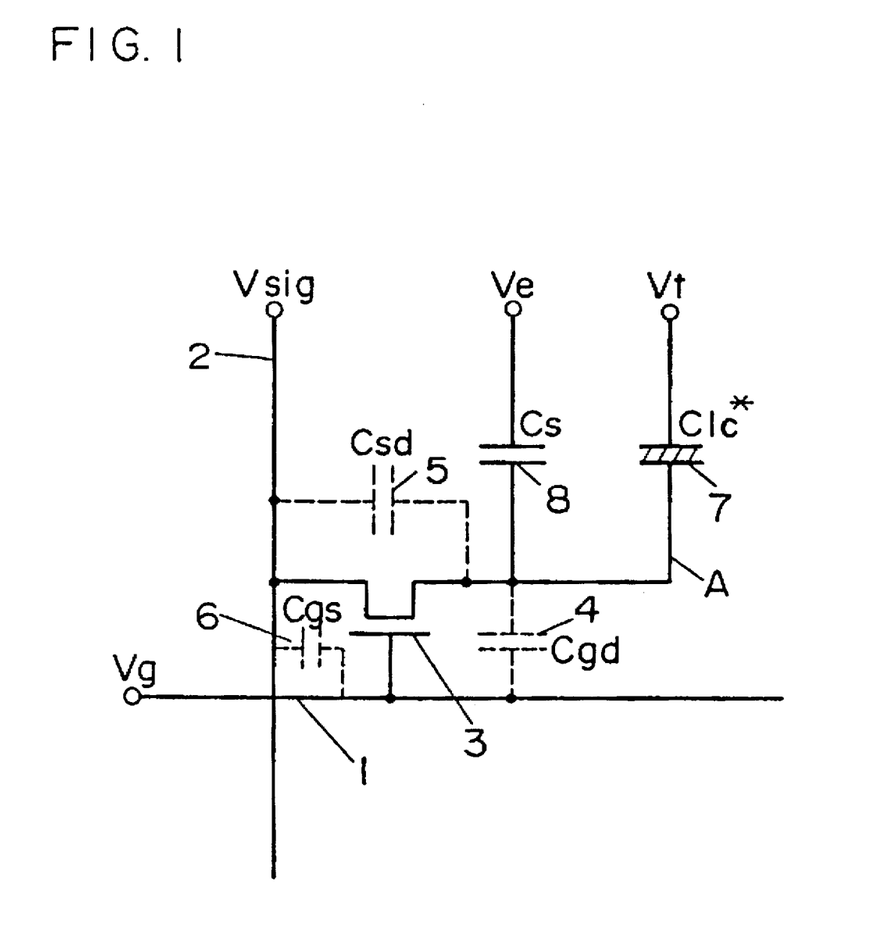
FIG. 1 is a diagram showing a picture element composition for explaining the principle of the present invention.
Figure 2A:
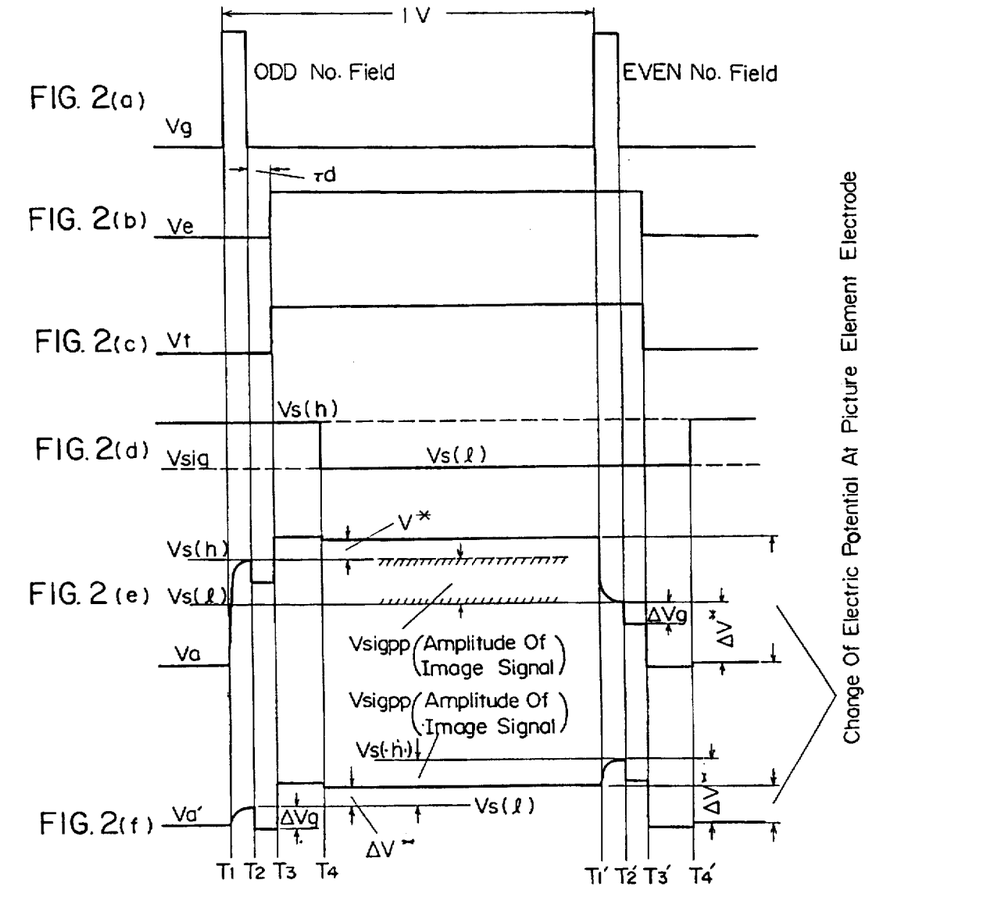

FIG. 1 shows an electric equivalent circuit of a display element of the TFT (Thin Film Transistor) active matrix for driving the LCD. Each display element possesses a TFT 3 at the intersection of a scanning signal wire 1 and a picture signal wire 2. The TFT includes, as parasitic capacitances, gate-drain capacitance Cgd 4, source-drain capacitance Csd 5, and gate-source capacitance Cgs 6. Furthermore, as intentionally formed capacitances, there are the liquid crystal capacitance Clc* 7 and the storage capacitance Cs 8.

Drive voltages are applied from external sources to the display element. Specifically, a scanning signal Vg is applied to the scanning signal wire 1, a picture signal voltage Vsig is applied to the picture signal wire 2, a second modulation signal Vt is applied to the counter electrode of the liquid crystal capacitance Clc*, and a first modulation signal Ve is applied to one of the electrodes of the storage capacitance Cs. Through these parasitic and intentionally formed capacitances, the effects of the drive voltages appear on the picture element electrode A.

Assume that voltages Vg, Ve, Vt and Vsig are as respectively shown in FIGS. 2(a) to (d). The change in potential $\Delta V^*$ at the picture element electrode A due to capacitance coupling is expressed in the following formula (1) (excluding, however, the change in potential at electrode A caused by electric conduction from turning ON the TFT).

$$\Delta V^* = -(C_{gd}V_g + C_s V_e + C_{sd}V_{sig} + C_{lc}^* V_t)/C_t \qquad (1)$$

where $$C_t = C_s + C_{gd} + C_{sd} + C_{lc}^* = C_p + C_{lc}^*,$$

and where the first term $C_{gd}V_g$ denotes the change in potential induced on the picture element electrode by the scanning signal Vg through the parasitic capacitance Cgd; the second term $C_s V_e$ denotes the effect of the first modulation voltage Ve; the third term denotes the change in potential induced on the picture element electrode by the picture signal voltage Vsig through the parasitic capacitance Csd; and the fourth term $C_{lc}^* V_t$ refers to the effect of the second modulation signal Vt. As for the fourth term, Clc* is the capacitance of the liquid crystal which changes due to the effect of the dielectric anisotropy as the state of the orientation of liquid crystal varies in response to the magnitude of the picture signal voltage (Vsig). Therefore, Clc* and $\Delta V^*$ vary depending on the largeness (Clc(h)) or smallness (Clc(l)) of the liquid crystal capacitance. (Although capacitance Cgs is present between the gate and signal electrode, it is ignored since both the scanning signal wire and picture signal wire are driven by low impedance power source and this capacitive coupling does not directly influence the display electrode potential.)

In consideration of eliminating the effects of the changes in capacitance due to the orientation of the liquid crystal, from two forms of equation (1) respectively corresponding to large (Clc(h)) and small (Clc(l)) liquid crystal capacitances, it follows that $$\Delta V(l) - \Delta V(h) = 0 \qquad (2)$$

and hence it is deduced that $$C_{gd}V_g + C_s V_e + C_{sd}V_{sig} = C_p V_t \qquad (3)$$

The first point to notice is that Clc* does not appear in equation (3). That is, when driven in a condition such that equation (3) is satisfied, the effect of the dielectric anisotropy of the liquid crystal is eliminated, and a DC voltage attributable to Clc* is not generated within the display device. At the same time, in the drive condition satisfying equation (3), it may also be considered that the scanning signal Vg may cancel and nullify the DC potential induced between the scanning signal wire 1 and the display electrode A through the parasitic capacitance Cgd. Equation (3) may be also rewritten as follows.

$$Ve = \{C_p V_t - C_{gd}V_g - C_{sd}V_{sig}\}/C_s \qquad (4)$$

Applying equation (4) to equation (1) yields $$\Delta V^* = \Delta V(l) = \Delta V(h) = V_t \qquad (5)$$

The second point to notice is the meaning behind equation (5). That is, the potential $\Delta V^*$ induced in the picture element electrode A is always equal to the amplitude of the second modulation signal Vt. Therefore, the signal voltage applied between the picture element electrode A and the counter electrode, while the TFT is in a conductive state, is maintained without being disturbed by the modulation signal. This phenomenon persists regardless of the liquid crystal capacitance. Thus, voltages of positive and negative polarities are equally applied to the liquid crystal, and flicker is decreased fundamentally (see FIG. 4).

The third point to notice is that the conditional equation (4) includes two voltage parameters Vt and Ve that can be arbitrarily set at the display device side. Accordingly, when Ve and Vt are controlled in conformity with equation (4), the potential change ΔV* appearing on the picture element electrode A can be set to a desired magnitude. On the other hand, Vg is a semifixed constant determined by the drive condition, but its effect can be corrected using Ve, Vt. Meanwhile, Vsig is the display data, and it varies arbitrarily between a maximum value and a minimum value. Therefore, depending on the magnitude of CsdVsig, it is not always possible to actually establish the conditional equation (4) accurately. However, in order to drive the display device so as to minimize the dissociation from equation (4), it is sufficient to reduce CsdVsig. Csd is a device constant. Therefore, to reduce CsdVsig, Vsig should be decreased while making full use of the effects of Vt, Ve. It is thus important that the two voltage parameters Ve and Vt can be set arbitrarily.

Furthermore, to reduce Vsig, the output amplitude of the picture signal driving circuit for controlling the analog signal Vsig is decreased, and the power consumption of the circuit is thus reduced in proportion to the square of the amplitude. In the case of a color display, similarly, power consumption is reduced in the chroma IC handling analog signals. On the other hand, Ve, Vt are digital signals, and the associated IC is on/off controlled. Therefore, when the first and second modulation signals Ve, Vt are applied, the overall power consumption of the driving system composed of complementary MOSIC devices is reduced.

Shown below are approximate capacitance values and voltage parameters used in the devices of the embodiments which are explained later.
Cs=0.68 pF, Clc(h)=0.226 pF, Clc(l)=0.130 pF, Cgd=0.028 pF, Csd=0.001 pF, V g=25 V, Ve=03 −+4 V, Vt=±3.5 V, Vsig=±2.0 V.

In consideration of these parameters, the third term of equation (4) may be substantially ignored and the expression may be rewritten as $$Ve=\{CpVt-CgdVg\}/Cs \quad (4a)$$

Furthermore, if there is no effect of the potential change of the scanning signal Vg, (4a) may be rewritten as $$Ve=CpVt/Cs \quad (4b)$$

FIGS. 2 (e) and (f) depict the changes in potential at the picture element electrode A when drive signals Vg, Vsig, and modulation signals Ve, Vt are applied to each respective electrode of the display element shown in FIG. 1. For example, in an odd-number field, when Vsig is at Vs(h) and is applied as shown by the solid line in FIG. 2(d), if a scanning signal Vg is provided at T=T1, the TFT is switched ON, and the potential Va at electrode A is charged until it is equal to Vs(h). Next, when the scanning signal Vg disappears at T=T2, the change in Vg appears as potential fluctuation ΔVg at electrode A through Cgd. Furthermore, after a delay time of τd, at T=T3, when Ve, Vt are made more positive, a positive displacement of the potential Va is effected. Afterwards, at T=T4, when Vsig changes from Vs(h) to Vs(l), a potential fluctuation similarly appears at electrode A. Combining with this capacitive coupling component, the sum is expressed as ΔV* in FIG. 2.

Later, when a scanning signal Vg is applied in an even-number field, the TFT charges electrode A up to the low level Vs(l) of Vsig. When the TFT is turned OFF, as in the case above, the capacitive coupling potential ΔV* appears. Thus, when the TFT is turned ON, if Vsig is at high level and Ve and Vt are at a low level, or, to the contrary, if Vsig is at low level and Ve and Vt are at a high level, and also if Ve and Vt vary after the TFT is turned OFF, the effective applied voltage Veff to the liquid crystal is, with respective to the picture signal amplitude Vsigpp, nearly equal to Vsigpp+ 2ΔV* as shown in FIG. 2, and both superpose on each other. In other words, the output amplitude of the picture signal from the output IC can be decreased by 2ΔV*. (Hereinafter, "reverse phase" denotes the phase relation of Ve, Vt and Vsig as stated above.)

On the other hand, when Vsig is applied as indicated by the broken line shown in FIG. 2 (d), with respect to the modulation signals Ve, Vt (called in phase), the effective applied voltage at electrode A is nearly 2ΔV*−Vsigpp, so that ΔV* and Vsig partially cancel each other.

Figure 3:
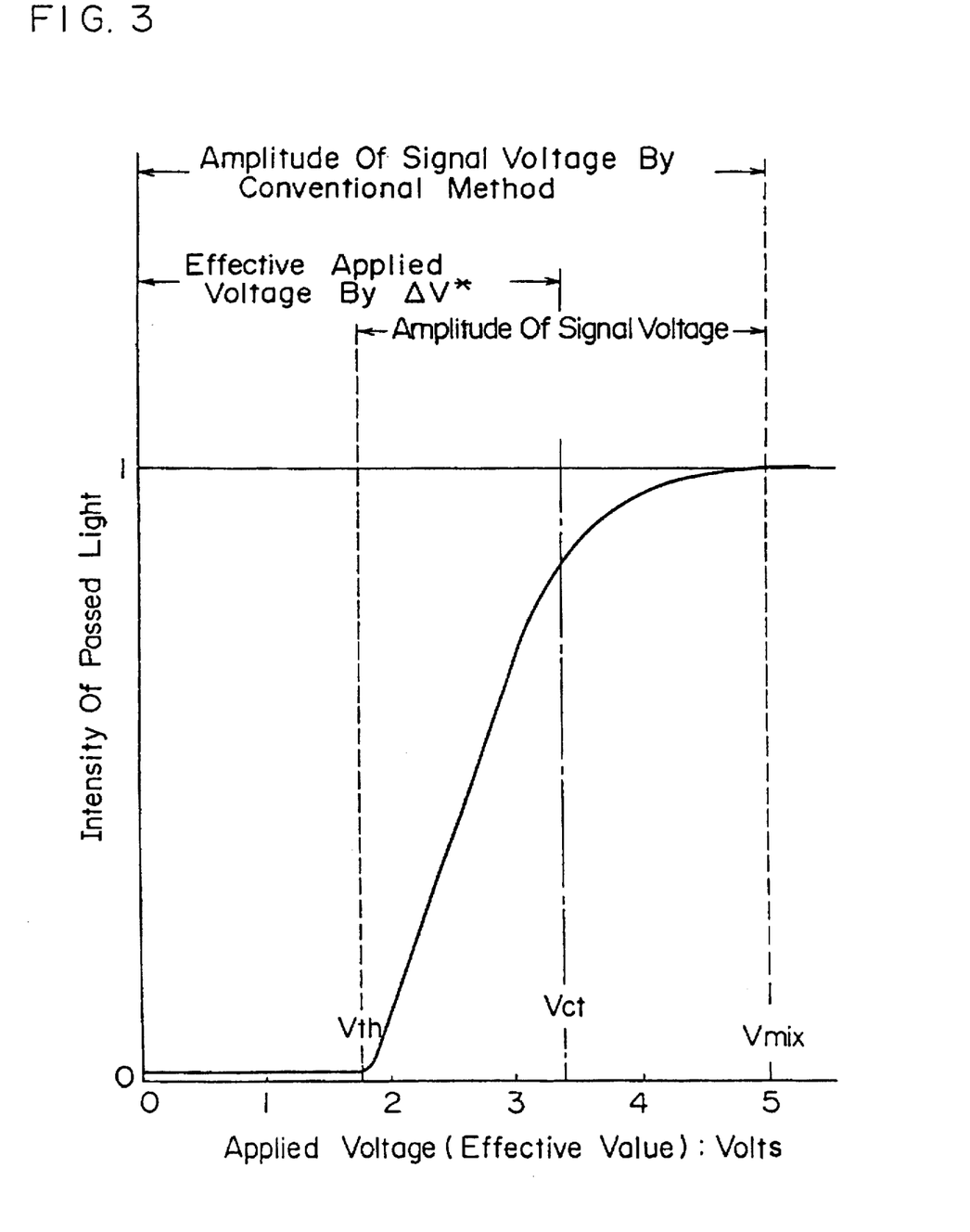
FIG. 3 is a diagram showing the relation between the light transmission intensity of the liquid crystal and the applied voltage.

FIG. 3 shows the relation between the applied voltage of the liquid crystal and the light transmission intensity, and also refers to a voltage range example for controlling the transmitted light using ΔV* and Vsig. The voltage range in which the transmitted light of the liquid crystal varies is from the Vth to Vmax. Setting the applied voltage by ΔV* at VCT, by controlling the amplitude and phase of the signal voltage, the required maximum signal amplitude voltage can decrease Vsigpp to (Vmax−Vth).

FIG. 2 shows a case where the positive and negative amplitudes of the first and second modulation signals are matched. In this case, it is not possible to compensate for the effect of inducing a DC potential difference between the mean potential of the picture element electrode A and the mean potential of the picture signal wire 2 through the coupling of the scanning signal voltage Vg with the parasitic capacitance. But this case realizes, as stated above, the effect of decreasing the picture signal Vsig amplitude, which is one of the objects of the invention.

Figure 4A:
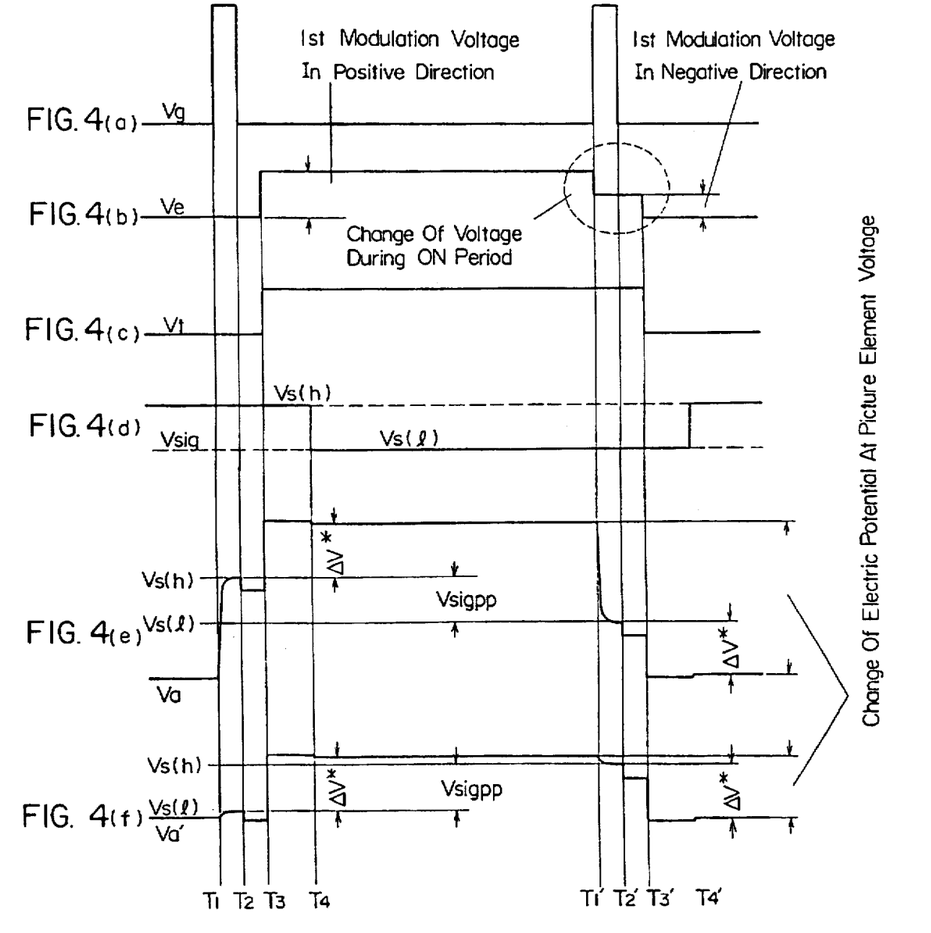

FIGS. 4(a)–(f) show a driving method in which the waveform arrangement shown in FIG. 2 is further improved. The fundamental distinction in FIG. 4 is that the amplitude in the positive and negative direction of at least one of the modulation signals is varied. That is, as shown by the circle of FIG. 4(b), at T=T1' (within the ON period of the TFT or before the TFT turns OFF), the amplitude of Ve is once changed, and the scanning carried out by Vg is complete (after the TFT is turned OFF), and at T=T3', the first modulation signal is again decreased in amplitude in the negative direction. (According to equation (4), it is also possible to change the amplitude of one or both of the first and second modulation signals.)

Figure 5:
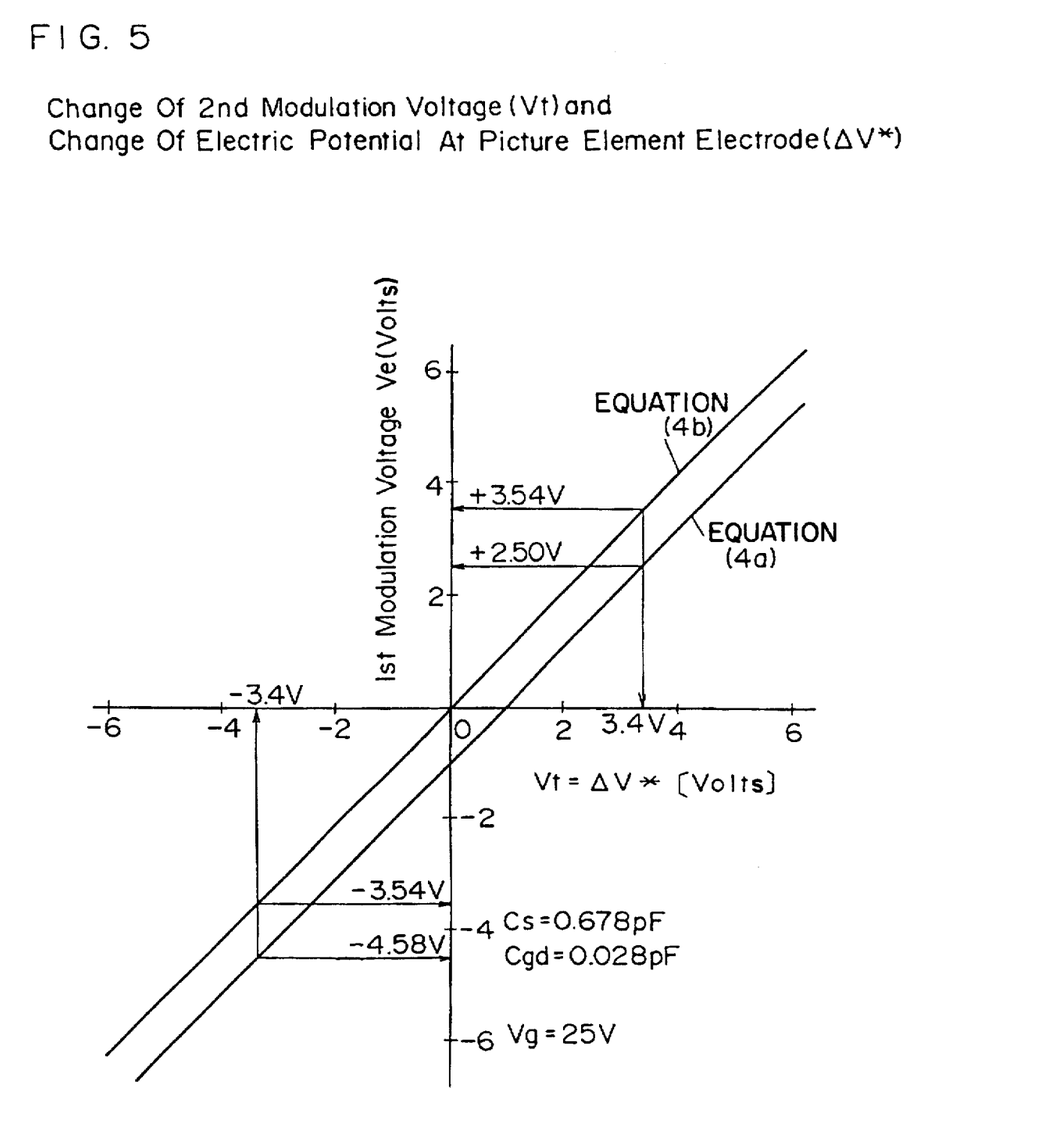
FIG. 5 is a diagram showing the relation between first and second modulation signal amplitudes, and potential changes $\Delta V^*$ of the picture element electrode due to capacitive coupling.

As shown in the TFT design condition of the present invention as stated above, if the potential change CsdVsig is small, the third term of equation (4) may be ignored, and equation (4a) is established. FIG. 5 shows the relation between the first modulation signal Ve and second modulation signal Vt in equations (4a), (4b). In this condition, it must be noted that Vt=ΔV*.

If, as shown in FIG. 3, 3.4 V is required as the effect of the modulation potential by ΔV*, then the amplitude of the second modulation signal Vt should be set at 3.4 V in both the positive direction and the negative direction (see equation (5)). Next, when setting the first modulation signal Ve, from the straight line (4a), depicting equation (4a), shown in FIG. 5, the amplitude from the negative to positive direction of Ve at T=T3 should be set at 4.58 V, and the amplitude from the positive to negative direction at T=T3' should be set at 2.50 V. The potential difference therebetween of 2.08 V is applied, in FIG. 4, as the potential fluctuation of Ve in the ON period of the TFT.

The effect of varying the amplitude of the modulation signal in the positive and negative directions will be clarified by comparing FIGS. 2(e) and (f) with FIGS. 4(e) and (f), each showing the potential Va of the picture element electrode A.

That is, in FIG. 2, the range of the amplitude of the picture element electrode potential Va is vertically asymmetrical with respect to the range of the picture signal Vsig amplitude. This is because the fluctuation of Vg in the negative direction at T=T2 and T=T2' continuously dislocates the picture element electrode potential Va in the negative direction through the parasitic capacitance Cgd. Accordingly, the potential of the picture signal wire 2 and the picture element electrode A differ on average by ΔVf, and this potential (ΔVg) is present as the DC component between both electrodes.

In FIG. 4, on the other hand, the fluctuation range of the picture element electrode potential Va is vertically symmetrical with respect to the range of the picture signal Vsig amplitude. This is because the change in potential of the picture element electrode A induced by Vg through parasitic capacitance Cgd is compensated at T=T2, T=T2', by varying the amplitude of the modulation signal in the positive direction at T=T3 and the modulation signal in the negative direction at T=T3'. In this way, the mean potential of the picture element electrode A and the mean potential of the picture signal wire 2 can be equalized. That is, the DC components of the both are zero, and are thus compensated. When driven in such manner, the phenomenon of image memory will be very slight as stated below.

In the case of FIG. 4, all the objects of the present invention as mentioned above are satisfied.

The present invention is further described below with reference to its embodiments.

EXAMPLE 1

Figure 6:
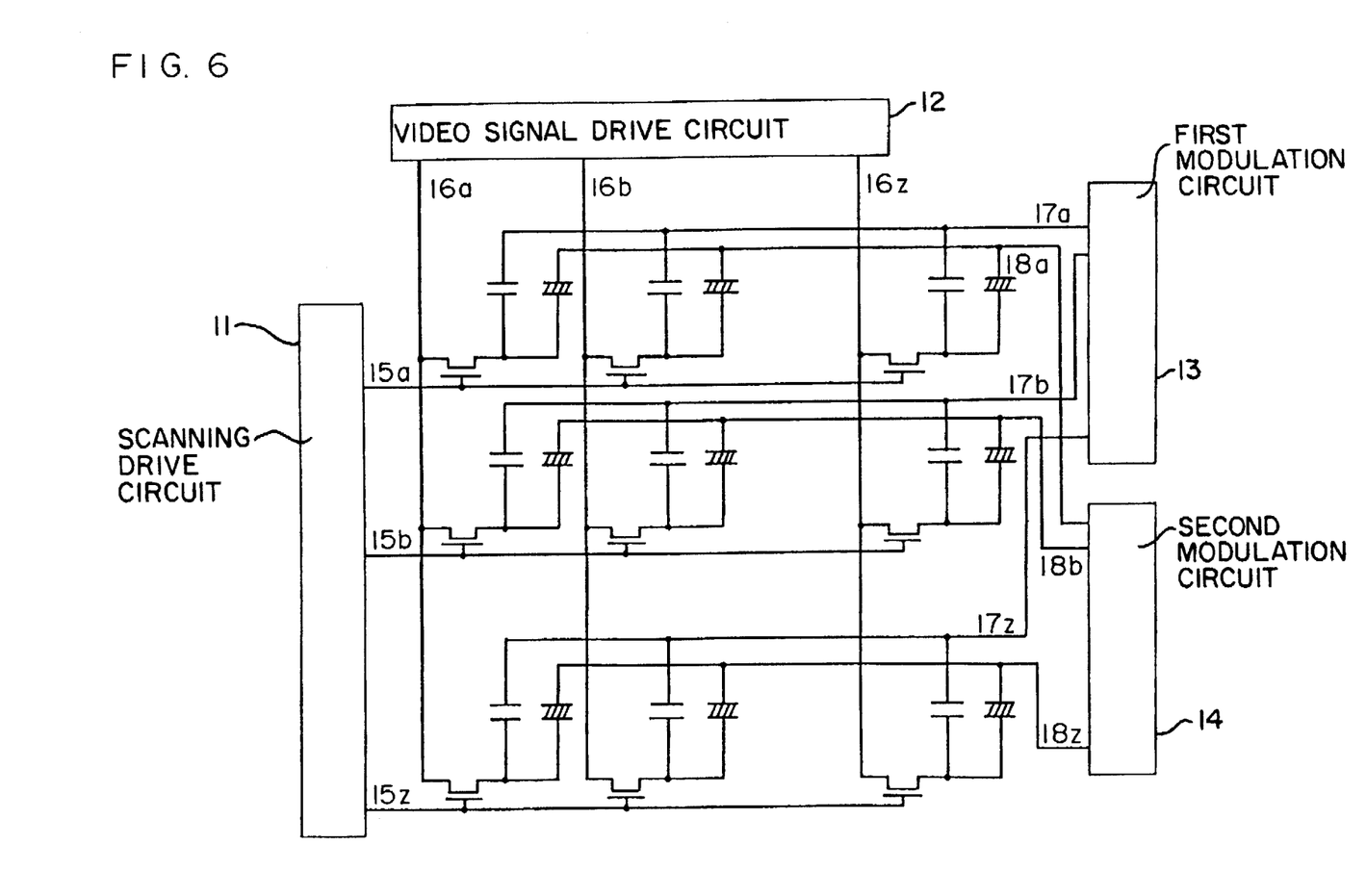
FIG. 6 is a diagram showing the basic composition of one embodiment of the present invention.
Figure 7A:
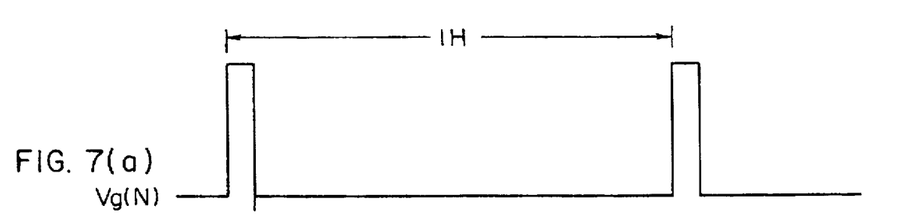
Figure 7B:
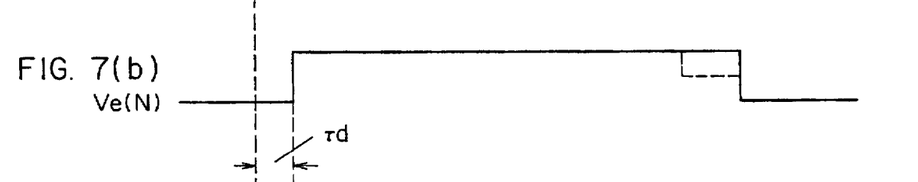
Figure 7C:
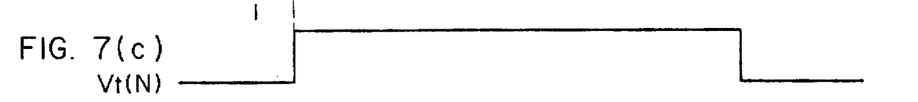
Figure 7D:
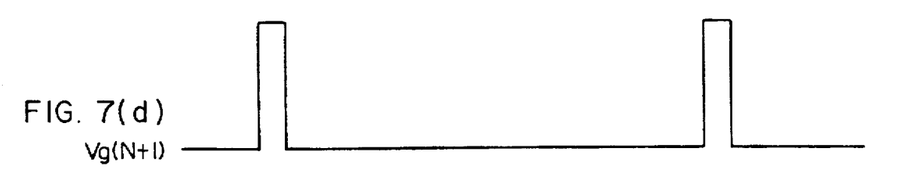
Figure 7E:
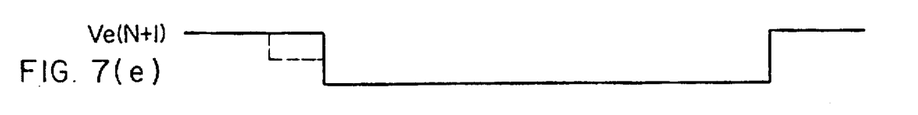
Figure 7F:
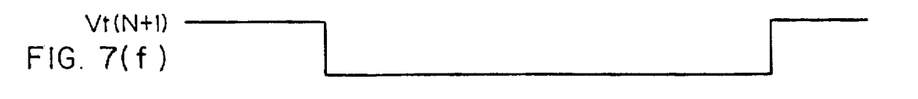

FIG. 6 shows a circuit diagram of a device of the first embodiment of the present invention, in which numeral 11 denotes a scanning drive circuit, 12 denotes a video signal drive circuit, 13 denotes a first modulation circuit, and 14 denotes a second modulation circuit. Furthermore, 15a, 15b, ..., 15z denote scanning signal wires, 16a, 16b, ..., 16z denote image signal wires, 17a, 17b, ..., 17z denote common electrodes of storage capacitances, and 18a, 18b, ..., 18z denote counter electrodes of the liquid crystal. In this embodiment, a storage capacitance electrode and counter electrode are separately provided for each scanning signal wire as shown, and the first and second modulation signals are applied according to each scanning signal. A timing chart of the scanning signal and the modulation signals is shown in FIGS. 7(a)–(f). FIGS. 7(a)–(c) show the scanning signal and modulation signals corresponding to the N-th scanning signal wire and FIGS. 7(d)–(f) show the same for N+1-th scanning signal wire. The mutual relation between the modulation signal and image signal, and ΔV* and Vsig is, intrinsically, the same as shown in FIG. 2. That is, the polarity of the image signal and modulation signal is inverted in every field.

In this embodiment, with the output amplitude of the signal voltage being only 2 Vpp, the entire black to white spectrum could be driven, and a high contrast display was realized. The brightness of the display image was adjusted by varying the amplitude ΔV* of the modulation signal.

EXAMPLE 2

In Example 2, the displacement of the first modulation signals Ve(N) and Ve(N+1) in the negative direction was varied in two steps as indicated by broken line in FIGS. 7(b) and (e). That is, the Ve potential was once varied at the ON period of the TFT, and after the TFT was turned OFF, the modulation signal was again varied in the negative direction, decreasing in amplitude as compared with the displacement in the positive direction.

In this embodiment, in addition to the effects of Example 1, flicker decreased, and the drive reliability increased.

EXAMPLE 3

Figure 8:
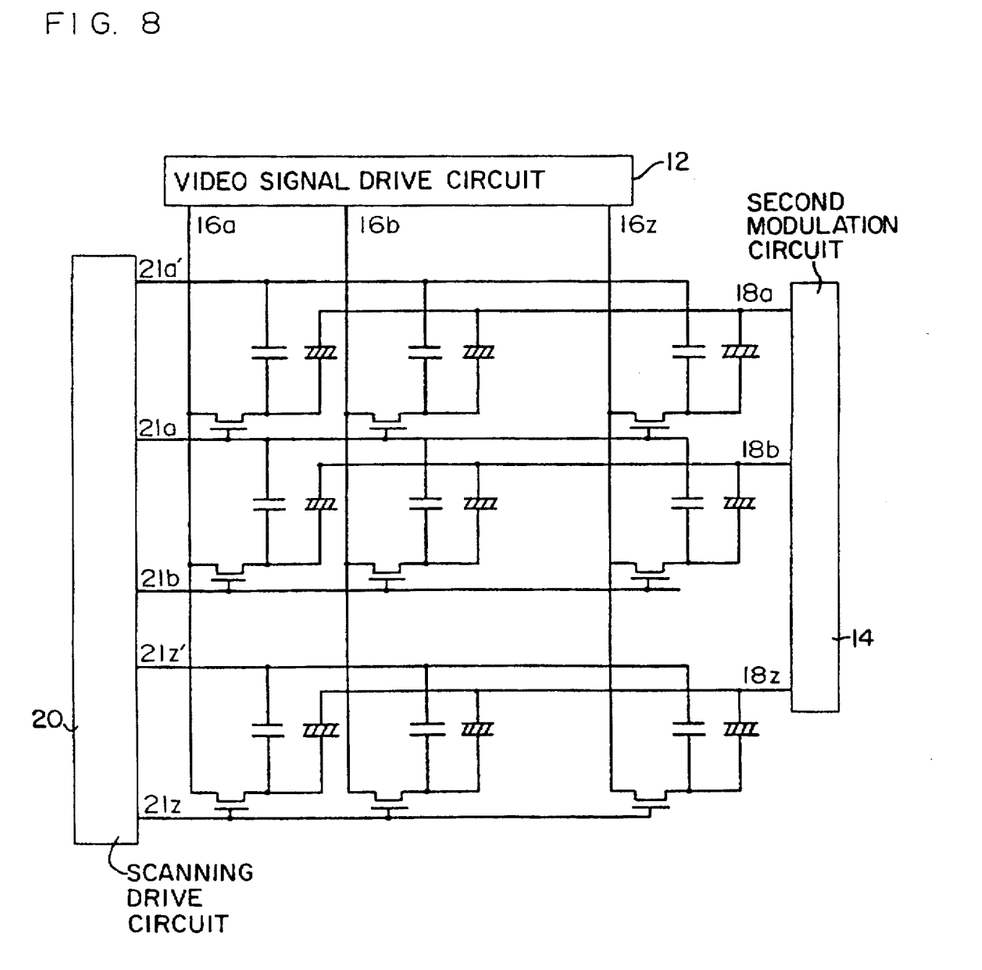
FIG. 8 is a diagram showing a basic composition of another embodiment of the present invention.
Figures 9A, 9B:
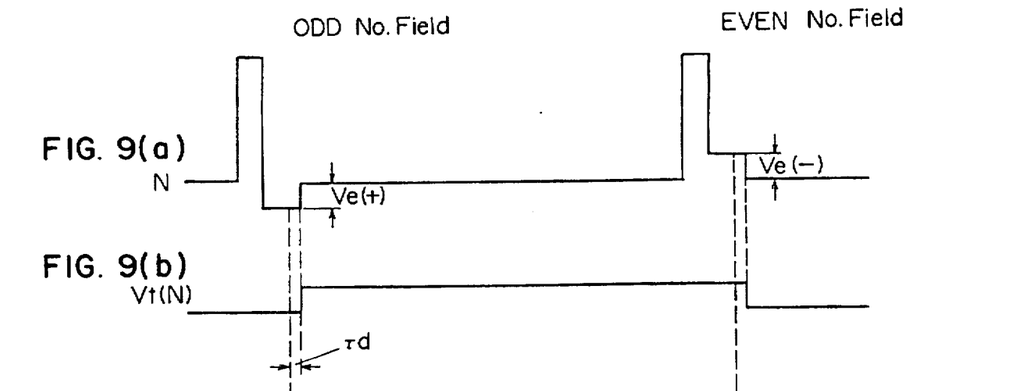
Figure 9C:
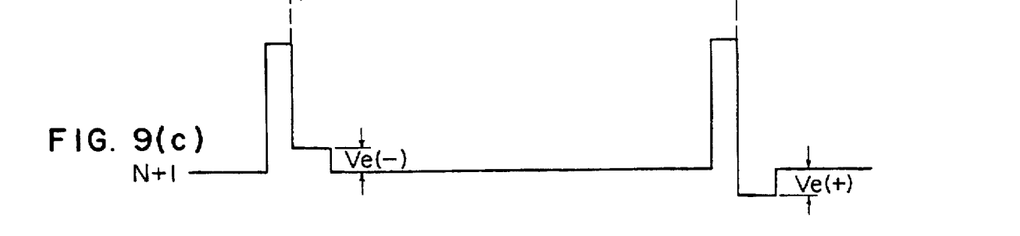
Figure 9D:
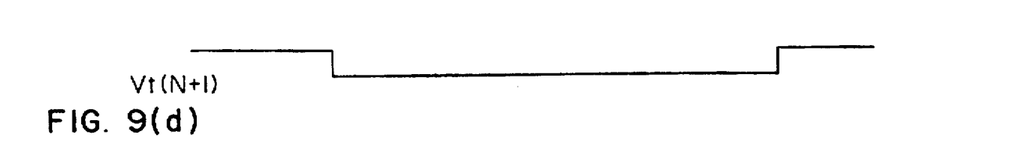

The circuit of the third embodiment is shown in FIG. 8, and the voltage waveforms applied to this circuit are shown in FIGS. 9(a)–(d). In FIG. 8, reference numeral 20 denotes a scanning drive circuit, 21a denotes a first scanning signal wire, 21a" denotes a common electrode wire of each storage capacitance attached to each picture element electrode of the first scanning signal wire, 21z denotes a final scanning signal wire, and 21z' denotes a final common electrode wire. This embodiment is different from Examples 1, 2 in that the common storage capacitance electrode of one stage was used as the scanning signal wire of the previous stage. Therefore, the first modulation signal of one stage is applied with the scanning signal of the preceding stage. As shown as in FIGS. 9(a)–(d), after scanning of the N+1-th scanning signal wire is complete (delay time τd), the polarities of the first modulation signal applied to the N-th scanning signal wire and the second modulation signal Vt(N) applied to the counter electrode attached to the N-th scanning signal wire are inverted.

The polarity inversion of the modulation signals may be effected either to the N-th and N+1-th scanning signal wires, or to the odd and even fields, or in duplication, or to the field alone. The potential variation of the first modulation signal in the positive direction Ve(+) and the potential variation in the negative direction Ve(−) are designed to be independently variable. When the absolute values of potential variations Ve(+) and Ve(−) are equalized, the same effects as in Example 1 were obtained, and when driven according to equation (4) by relatively decreasing Ve(+) as compared with Ve(−), the same effects as in Example 2 were obtained.

The effects of this embodiment were the same as those in Examples 1, 2.

EXAMPLE 4

Figure 10:
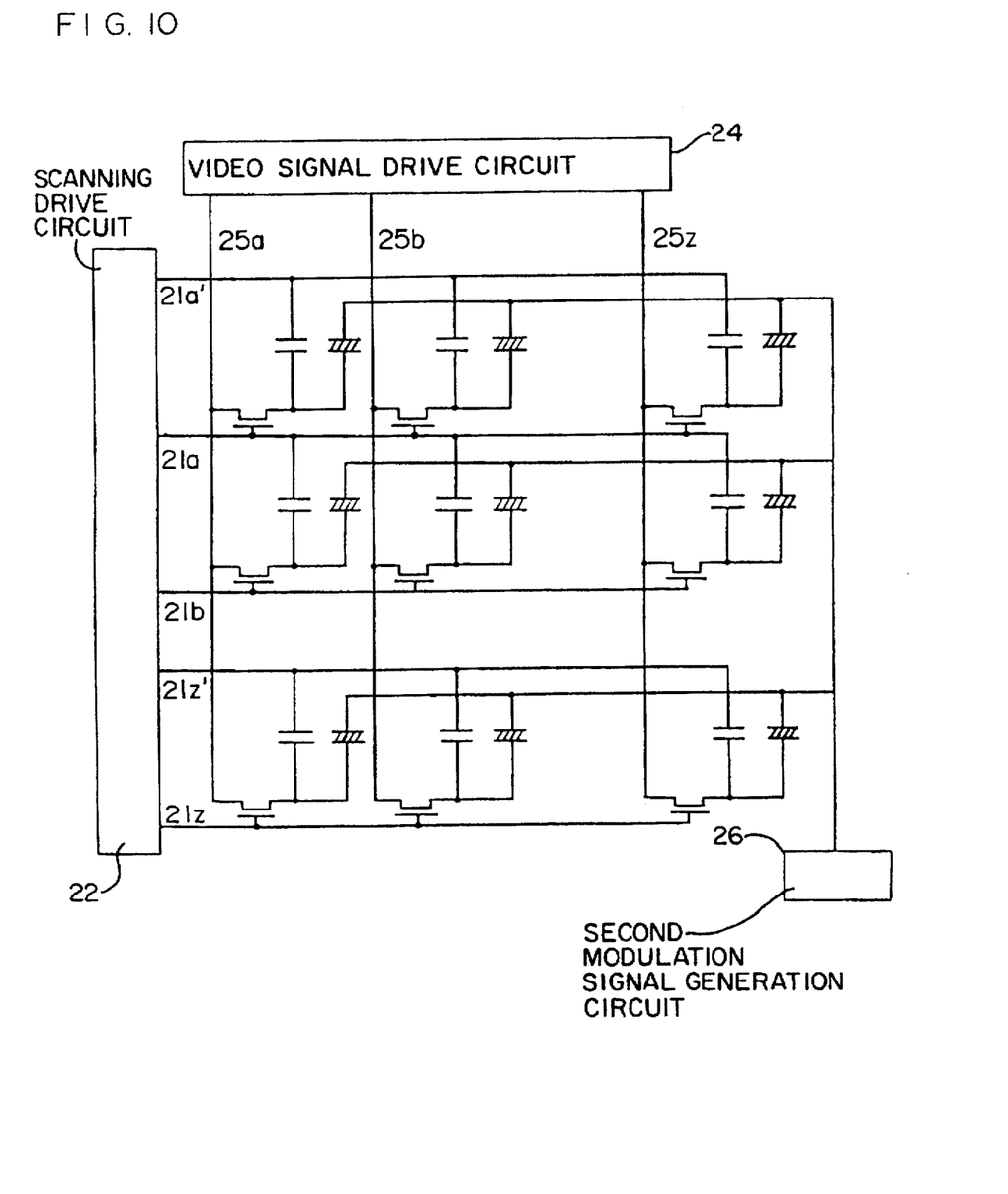
FIG. 10 is a diagram showing a basic composition of another embodiment of the present invention.

The circuit of the fourth embodiment is shown in FIG. 10, and the voltage waveforms applied to this embodiment are shown in FIGS. 11(a)–(d).

Figures 11A, 11B:
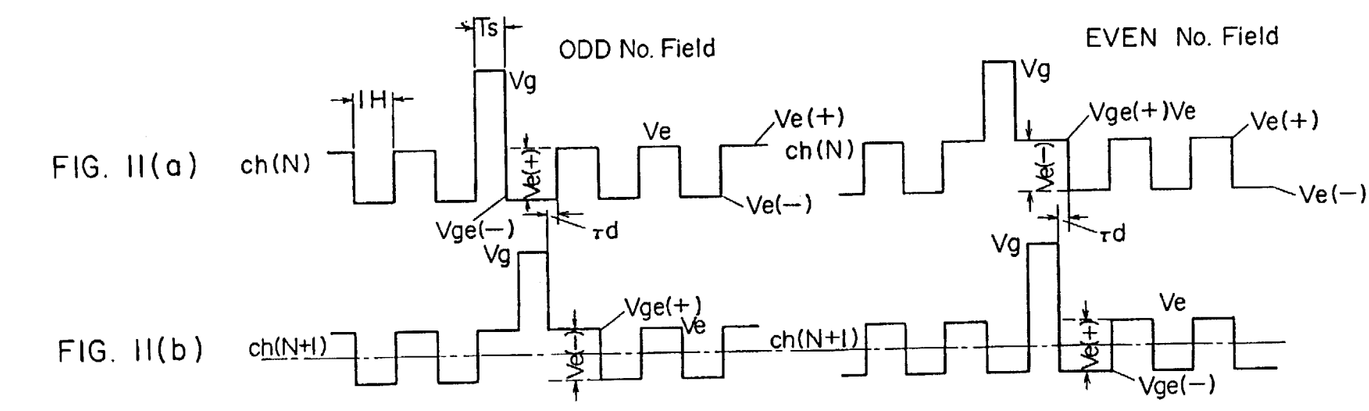
Figure 11C:
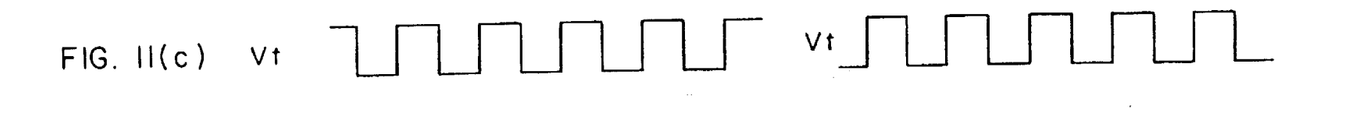
Figure 11D:
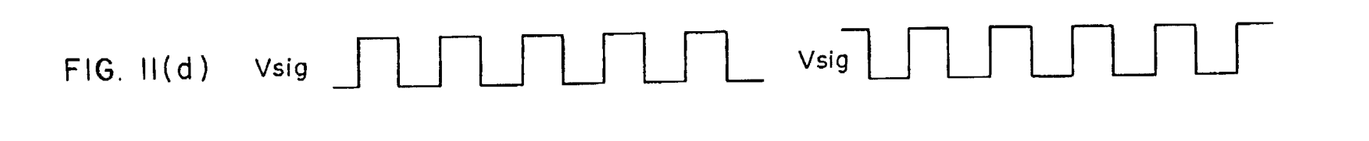

In this embodiment, as in Example 3, the first modulation signal of one stage is applied in duplication with the scanning signal of a previous stage. However, according to Example 4, a distinct counter electrode is not provided for each corresponding scanning signal wire, and instead, the counter electrode is the same over the entire display device, and the polarities of the picture element electrode and counter electrode are varied in every scanning period (1 H). In FIG. 10, 22 denotes a scanning drive circuit, 24 denotes a video signal drive circuit, and 26 denotes a second modulation signal generation circuit. Meanwhile, 25a, 25b, ..., 25z denote picture signal wires. In FIGS. 11(a) and (b), Ch(N) and Ch(N+1) denote voltage waveforms applied to the N-th and N+1-th scanning signal wires. In FIGS. 11(c) and (d), Vt denotes a second modulation signal, and Vsig denotes a picture signal. FIGS. 11(a)–(d) also show the difference in voltage waveform (polarity inversion) in the odd field and even field for AC driving of the liquid crystal.

The higher amplitude waveform Vg of waveforms Ch(N), Ch(N+1) is a scanning signal, and the rectangular waveform linking to its front and rear is a first modulation signal Ve. The amplitude of Ve is controlled at an identical voltage and fixed amplitude for all the scanning signal wires. However, only the potentials Vge(+), Vge(−) (indicated by thick lines right after the scanning signal) were controlled independently. Therefore, as the first modulation signal right after the end of the scanning signal, Vge(−)-Ve(+) is defined as the change in potential in the positive direction, and Vge(+)-Ve(−) as the change in potential change in the negative direction. The application time Ts of the scanning signal is variably controllable within less than one scanning period. After termination of scanning of the next stage {Ch(N+1)}, following the delay time τd, first and second modulation signals were applied.

In this embodiment, Ve is commonly applied to all scanning signal wires in phase. Therefore, the second term CsVe in equation (1) becomes (Cs+Cgd)Ve=CpVe. Hence, the equation (3) is rewritten as follows, $$CgdVg+CpVe+CsdVsig=CpVt$$

If CsdVsig can be ignored, the conditional formula (4) may be classified into the following two cases:

1. Right after the termination of scanning signal Vg.

$$Ve=\{CpVt-CgdVg\}/Cp=Vt-VgCgd/Cp \quad (4a')$$

2. Otherwise, $$Ve=CpVt/Cp=Vt \quad (4b')$$

Thus, after the scanning signals, when potentials Ve(−), Ve(+) and Ve are controlled independently, both conditions (4a'), (4b') will be established.

Therefore, in this embodiment it is also intended to vary the polarity of the potentials of the counter electrode and picture element electrode in every scanning period, and by adjusting Ve(+), Ve(−) and Ve independently, the effects of the dielectric anisotropy of the liquid crystal can be compensated, and the DC potential difference occurring between the picture signal wire and picture element electrode can be rendered zero. (As a natural consequence, the mean potential of the picture signal provided to the picture signal wire and the mean potential of the picture element electrode are equal to each other.) Thus, by eliminating the principal causes of flicker and image memory, the drive reliability is enhanced, and the consumed electric power can be decreased. In this case, the gradation controllability is also markedly improved.

EXAMPLE 5

In Example 5, the potentials Vge(−) and Vge(+) right after the scanning signal were made equal to the potentials Ve(−) and Ve(+), respectively. In this case, the drive conditions are not matched with the conditional equation (4b) in one scanning period right after the scanning signal, but in the other display periods, the driving conditions conform to the fundamental conditional equation (4b). For example, in the case of 240 scanning lines, the 238 periods conform to equation (4b), which may practically be regarded as the entire scan period. As a result, for the display device, the number of power outputs could be reduced by two as compared with Example 4, and the construction of the scanning drive circuit can be simplified.

A display device is thus obtained that is lower in power consumption and price, but is almost the same in performance as compared with Example 4.

EXAMPLE 6

In Example 6, the potential of the second modulation signal generator 26 shown in FIG. 10 was made floating. That is, the counter electrode was not connected to any terminal, and the circuit was driven in a floating potential state. In this case, the first modulation signal Ve applied to all of the scanning signal wires appears at the counter electrode through the electrostatic capacitance in the display device. Within the display device, there is a picture signal wire held at a potential which is indifferent to Ve, and the second modulation signal appearing at the counter electrode is generally smaller in amplitude than Ve, and the condition formula (4b') is not satisfied perfectly. However, the source for generation of the second modulation signal can be omitted, and the power conservation effect is significant. It is also possible to display pictures having excellent qualities, and the objects of the invention are almost completely obtained.

EXAMPLE 7

In Example 7, the second modulation signal generator 26 was composed of a capacitor. One of the electrodes of the capacitor was connected to the counter electrode, and the other electrode of the capacitor was connected to the first modulation signal generator. In this case, as for the capacitance of the capacitor, it is sufficiently larger than the capacitance between the counter electrodes of the display device and all of the picture signal wires, but not as large as the capacitance between the counter electrodes and all of the electrodes on the other board. This construction enables the drive operation while satisfying the conditional formula (4b') of Ve=Vt. Furthermore, the second modulation signal generator is not particularly needed, and the power conservation effect is significant.

EXAMPLE 8

In Example 8, one electrode of a resistance is connected to the capacitor of Example 7 and to the counter electrode connected to the capacitor, and the other electrode of the resistance was connected to an electrode held at a specific potential. The resistance value R of this resistance is such that the time constant CR is sufficiently larger than the period (1/H) of the modulation signal.

EXAMPLE 9

In Example 9, referring to FIG. 6, the common storage capacitance wires 17a, 17b, ..., 17z were commonly connected, and furthermore the common counter electrode wires 18a, 18b, ..., 18z were commonly connected, and in this constitution, a drive operation similar to Example 4 was effected by changing the polarity of the display electrodes in every one scanning period. In this case, although it is not possible to eliminate the internal DC potential difference, a favorable picture display is realized.

As is clear from the description herein, this invention possesses, among others, the following notable effects.

Firstly, the output signal voltage of the signal drive circuit of the active matrix display device an be significantly decreased, and the power consumption of the same drive circuit handling analog signals is reduced. Furthermore, when this invention is used in a color display, the output amplitude of the chroma IC is also decreased, and the power consumption of the circuit is also reduced. Thus, the drive electric power consumed by the entire display device can be decreased. Further, a decrease in the amplitude of the output signal voltage brings about secondary effects, such as an increased ease of fabrication of the circuit, the use of a region of good linearity of the signal amplifier, and an improvement in display quality.

Secondly, the display picture quality is improved. Even during AC driving of every field as shown in Examples 2 and 3, flicker could be removed. In Example 4, in addition to the above, a uniform display brightness and a notable enhancement of the gradation display performance were observed.

Thirdly, the reliability of display device is enhanced due to the removal of the DC voltage conventionally occurring in the display device as a result of the anisotropy of the liquid crystal and capacitive coupling of the scanning signal line through Cgd. These DC voltage components conventionally caused various display defects. By removal of such a DC voltage, the phenomenon of the image occurring right after the display of a fixed image was greatly improved. Furthermore, the drive condition conforming to formula (4) is not affected by the dielectric anisotropy of the liquid crystal, meaning that, when the display device is used in a wide temperature range, if the dielectric constant itself varies, its effects do inhibit a stable drive operation.

In the foregoing description, the present invention was applied in a liquid crystal display device, but it may be also applied in other flat plate display devices.

According to the present invention, a reduction in power consumption, an improvement in picture quality, and an enhancement in reliability may be achieved simultaneously.

While specific embodiments of the present invention have been illustrated and described herein, modifications and changes will occur to those skilled in the art. It is therefore to be understood that the appended claims are intended to cover all such modifications and changes as fall within the true spirit and scope of the invention.

We claim:

1. A method of driving a display device, the display device comprising plural picture-element electrodes disposed in a matrix form so as to define plural rows and columns, plural thin film transistors having drain, source and gate electrodes connected to said picture-element electrodes, video signal wires and scanning signal wires, respectively, said video signal wires respectively connected to said columns of picture element electrodes through said plural thin film transistors and said scanning signal wires respectively connected to said rows of picture element electrodes through said plural thin film transistors, first plural wires which are electrically separated from each other and respectively commonly coupled with said picture-element electrodes of each row through a capacitance and running in parallel with said scanning signal wires, and plural counter electrodes which are electrically separated from each other and respectively commonly coupled through a display material with said picture-element electrodes of each row and running in parallel with said scanning signal wires, said display material being AC-driven, said method comprising:

applying a scanning voltage to said scanning signal wires in succession to turn ON said thin-film transistors connected to each row of said picture element electrodes while said scanning voltage is applied to a corresponding scanning signal wire;

applying a video signal voltage to said video signal wires for each row of said picture-element electrodes during a respective ON-period of each corresponding row of said thin film transistors;

applying a respective first modulation signal to said respective first plural wires of each row in positive and negative directions alternately for every field period during an OFF-period of each corresponding row of said thin film transistors and at a certain time after completion of said ON-period of each corresponding row of said thin film transistors; and at the same time applying a respective second modulation signal to said counter electrodes of each row which alternates in positive and negative directions in synchronism with said first modulation signal applied to a corresponding first wire to modulate potentials of said picture-element electrodes and to thereby apply a voltage to said display material.

2. A method as recited in claim 1, wherein said first plural wires are neighboring scanning signal wires.

3. A method as recited in claim 2, wherein an amplitude of said first modulation signal applied to said first plural wires differs between the positive and negative directions.

4. A method as recited in claim 3, wherein a positive amplitude of said first modulation signal applied to said first plural wires is larger than a negative amplitude for a N-channel thin film transistor and a positive amplitude of said first modulation signal applied to said first plural wires is smaller than a negative amplitude for a P-channel thin film transistor.

5. A method as recited in claim 3, wherein a potential of said first modulation signal is partly changed before said ON-period of said thin film transistor is terminated.

6. A method as recited in claim 4, wherein a potential of said first modulation signal is partly changed before said ON-period of said thin film transistor is terminated.

7. A method as recited in claim 1, wherein an amplitude of said first modulation signal applied to said first plural wires differs between the positive and negative directions.

8. A method as recited in claim 7, wherein a positive amplitude of said first modulation signal applied to said first plural wires is larger than a negative amplitude for a N-channel thin film transistor and a positive amplitude of said first modulation signal applied to said first plural wires is smaller than a negative amplitude for a P-channel thin film transistor.

9. A method as recited in claim 8, wherein a potential of said first modulation signal is partly changed before said ON-period of said thin film transistor is terminated.

10. A method as recited in claim 7, wherein a potential of said first modulation signal is partly changed before said ON-period of said thin film transistor is terminated.

11. A method as recited in claim 1, wherein amplitudes of said first and said second modulation signals are the same.

12. A method of driving a display device, the display device comprising plural picture-element electrodes disposed in a matrix form so as to define plural rows and columns, plural thin film transistors having drain, source and gate electrodes each connected to said picture-element electrodes, video signal wires and scanning signal wires, respectively, said video signal wires respectively connected to said columns of picture element electrodes through said plural thin film transistors and said scanning signal wires respectively connected to said rows of picture element electrodes through said plural thin film transistors, plural first wires which are commonly coupled with said picture-element electrodes of each row through a capacitance and running in parallel with said scanning signal wires, and counter electrodes disposed at a position counter to said picture-element electrodes across a display material, said display material being AC-driven, said method comprising:

applying a scanning voltage to said scanning signal wires in succession to turn ON said thin-film transistors connected to each row of said picture element electrodes while said scanning voltage is applied to a corresponding scanning signal wire;

applying a video signal voltage to said video signal wires for each column of said picture-element electrodes during a respective ON-period of each corresponding row of said thin film transistors;

applying a first modulation signal having a polarity which is reversed every fixed period to said plural first wires at the same time;

applying a second modulation signal having a polarity which is reversed every fixed period to said counter electrodes in synchronism with said first modulation signal to modulate potentials of said picture-element electrodes and to thereby apply an AC voltage to said display material.

13. A method as recited in claim 12, wherein amplitudes of said first and said second modulation signals are the same.

14. A method as recited in claim 12, wherein polarities of said first and said second modulation signals are the same.

15. A method as recited in claim 14, wherein said fixed period is the same as one horizontal scanning period.

16. A method as recited in claim 12, wherein polarities of said first and said second modulation signals are inverted at every said fixed period.

17. A method as recited in claim 12, wherein said fixed period is the same as one horizontal scanning period.

18. A method as recited in claim 12, wherein an amplitude of said first modulation signal is larger in a positive direction than in a negative direction for a certain period after said applictaion of said scanning voltages as compared with the remainder of the period for N-channel thin film transistors, and an amplitude of said first modulation signal is smaller in a positive direction than in a negative direction for a certain period after said application of scanning voltages as compared with the remainder of the period for P-channel thin film transistors.

19. A method as recited in claim 12, wherein a potential of said first modulation signal applied in duplication to said scanning signal wire is lower than a gate voltage at which said thin film transistors are turned off.

20. A method as recited in claim 12, wherein a potential of said first modulation signal is varied during said ON-period and varied again during an OFF-period of said thin film transistor.

21. A method of driving a display device, the display device comprising plural picture-element electrodes disposed in a matrix form so as to define plural rows and columns, plural thin film transistors having drain, source and gate electrodes each connected to said picture-element electrodes, video signal wires and scanning signal wires, respectively, said video signal wires respectively connected to said columns of picture element electrodes through said plural thin film transistors and said scanning signal wires respectively connected to said rows of picture element electrodes through said plural thin film transistors, said picture-element electrodes of a first row coupled through a capacitance with a first wire, said picture-element electrodes after said first row coupled through a capacitance with a scanning signal wire of a previous row of picture elements, and a counter electrode disposed at a position counter to said picture-element electrodes across a display material, said display material being AC-driven, said method comprising:

applying a scanning voltage to said scanning signal wires in succession to turn ON said thin-film transistors connected to each row of said picture element electrodes while said scanning voltage is applied to a corresponding scanning signal wire;

transmitting video signal voltages to said video signal wires for each column of said picture-element electrodes during a respective ON-period of each corresponding row of said thin film transistors;

applying a second modulation signal having a polarity which is reversed every fixed period to said counter electrodes; applying a first modulation signal to said first wires and in duplication to said scanning signal wires during an OFF-period of said thin film transistors to modulate a potential of said picture-element electrode and to thereby apply a voltage to said display material.

22. A method as recited in claim 21, wherein amplitudes of said first and said second modulation signals are the same.

23. A method as recited in claim 21, wherein polarities of said first and said second modulation signals are the same.

24. A method as recited in claim 21, wherein polarities of said first and said second modulation signals are inverted every fixed period.

25. A method as recited in claim 24, wherein said fixed period is the same as one horizontal scnning period.

26. A method as recited in claim 21, wherein said fixed period is the same as one horizontal scanning period.

27. A method as recited in claim 21, wherein the amplitude of said first modulation signal is larger in a positive direction than in a negative direction for a certain period after said application of said scanning voltages as compared with the remainder of the period for N-channel thin film transistors, and an amplitude of said first modulation signal is smaller in a positive direction than in a negative direction for a certain period after said application of scanning voltages as compared with the remainder of the period for P-channel thin film transistors.

28. A method as recited in claim 21, wherein the potential of said first modulation signal is lower than a gate voltage at which said thin film transistors are turned off.

29. A method as recited in claim 21, wherein a potential of said first modulation signal is varied during said ON-period and varied again during said OFF-period of said thin film transistor.

30. A method of driving a display device, the display device including (a) a plurality of liquid crystal picture elements disposed in a matrix form so as to define plural rows and columns, each picture element having a picture element electrode and a counter common electrode, (b) a plurality of thin film transistors having drain, source and gate electrodes each connected to said picture element electrode, a video signal wire and a scanning signal wire respectively, said each video signal wire being connected to said picture element electrodes of each column through said thin film transistors, said each scanning signal wire being connected to said picture element electrodes of each row through said thin film transistors, (c) a plurality of capacitors respectively associated with each said picture element, one electrode of each said capacitor being coupled to said each picture element electrode of said associated picture element, the other electrodes of said capacitors of each row being commonly connected to said scanning signal wires of a previous row, said display device being AC-driven, said method comprising:

applying a scanning voltage to said scanning signal wire to turn ON said thin film transistors connected to said picture element electrodes of each row;

transmitting video signal voltages applied to said video signal wires of each column to said picture element electrodes of each row during a respective ON-period of each corresponding row of said thin film transistors;

applying a first modulation signal to said scanning signal wires of a previous row in duplication, applying a second modulation signal having a polarity which is reversed every fixed period to said counter common electrodes of said picture elements to modulate a voltage applied to said picture elements.

31. A method as recited in claim 30, wherein said first modulation signal is applied to said scanning signal wires during an OFF-period of said thin film transistor.

32. A method as recited in claim 30, wherein a potential of said first modulation signal is varied during said ON-period and varied again during said OFF-period of said thin film transistor.

33. A method of driving a display device, the display device including (a) a plurality of liquid crystal picture elements disposed in a matrix form so as to define plural rows and columns, each picture element having a picture element electrode and a counter common electrode, (b) a plurality of thin film transistors having drain, source and gate electrodes each connected to said picture element electrode, a video signal wire and a scanning signal wire respectively, said each video signal wire being connected to said picture element electrodes of each column through said thin film transistors, said each scanning signal wire being connected to said picture element electrodes of each row through said thin film transistors, (c) a plurality of capacitors respectively associated with each said picture element, one electrode of each said capacitor being coupled to said each picture element electrode of said associated picture element, the other electrodes of said capacitors of the first row being commonly connected to a first signal wire, the other electrodes of said capacitors after the first row being commonly connected with said scanning signal wires of a previous row, said display device being AC-driven, said method comprising:

applying a scanning voltage to said scanning signal wire to turn ON the thin film transistors connected to said picture element electrodes of each row;

transmitting video signal voltages applied to said video signal wires of each column to said picture element electrodes of each row during a respective ON-period of each corresponding row of said thin film transistors;

applying a first modulation signal to said first signal wire and said scanning signal wires of a previous row in duplication, and applying a second modulation signal having a polarity which is reversed every fixed period to said counter common electrodes of said picture elements to modulate a voltage applied to said picture elements.

34. A method as recited in claim 33, wherein the potential of said first modulation signal is varied during said ON-period and varied again during an OFF-period of said thin film transistor.

* * * * *